United States Patent [19]
Nagaura

[11] Patent Number: 5,534,369
[45] Date of Patent: Jul. 9, 1996

[54] BATTERY HAVING DIVIDED ELECTRODE PORTIONS

[75] Inventor: Toru Nagaura, Fukuoka, Japan

[73] Assignee: Hival Ltd., Fukuoka, Japan

[21] Appl. No.: 402,040

[22] Filed: Mar. 10, 1995

[30] Foreign Application Priority Data

Mar. 10, 1994 [JP] Japan .................................. 6-079149

[51] Int. Cl.⁶ .............................. H01M 2/26; H01M 2/20
[52] U.S. Cl. ................................ 429/161; 429/7; 429/59; 429/128
[58] Field of Search ............................ 429/50, 59, 60, 429/128, 161, 7

[56] References Cited

U.S. PATENT DOCUMENTS

| | | | |
|---|---|---|---|
| 375,559 | 12/1887 | McLaughlin | 429/128 |
| 3,470,025 | 9/1969 | Yehiely | 429/60 |
| 5,238,756 | 8/1993 | Fetcenko et al. | 429/59 |

*Primary Examiner*—Stephen Kalafut
*Assistant Examiner*—Carol Chaney
*Attorney, Agent, or Firm*—Nikaido, Marmelstein, Murray & Oram

[57] ABSTRACT

At least one of a positive electrode and a negative electrode constituting an electrode assembly comprises at least two divided electrode portions not connected through electron conduction. The divided electrode portions each have an electrode lead extending outward from a battery container, which has at least two external terminals of the same polarity which is provided by the lead. The external terminals of the same polarity are connected to each other via a resistor having a PTC effect. The battery is assured of improved safety even when large-sized.

1 Claim, 4 Drawing Sheets

Fig.7
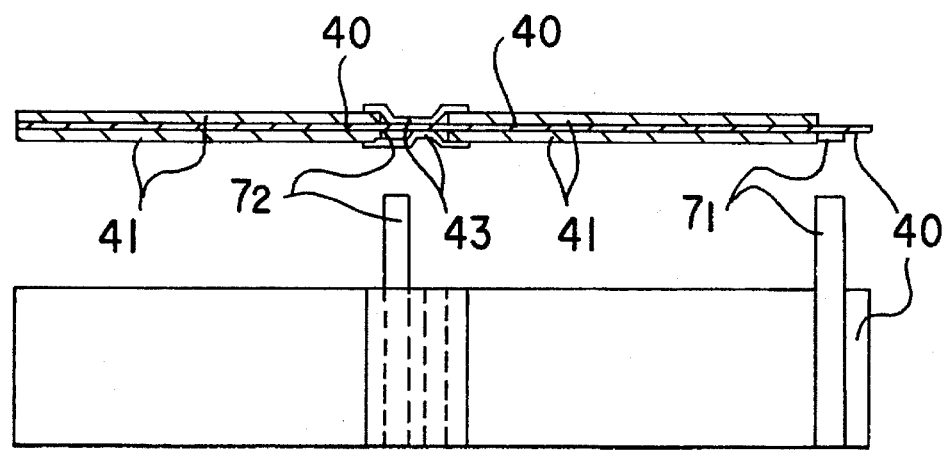
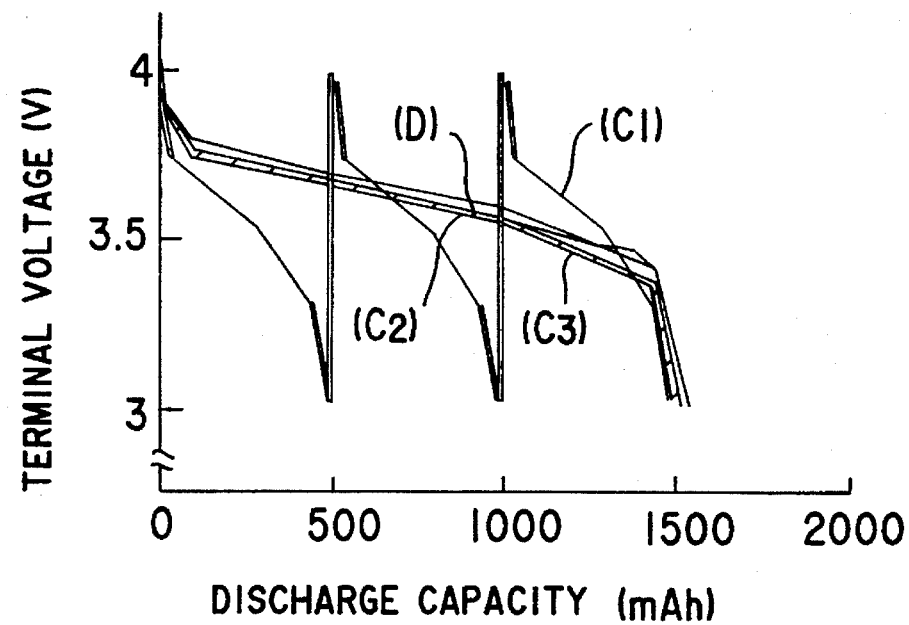
Fig.8
Fig.9
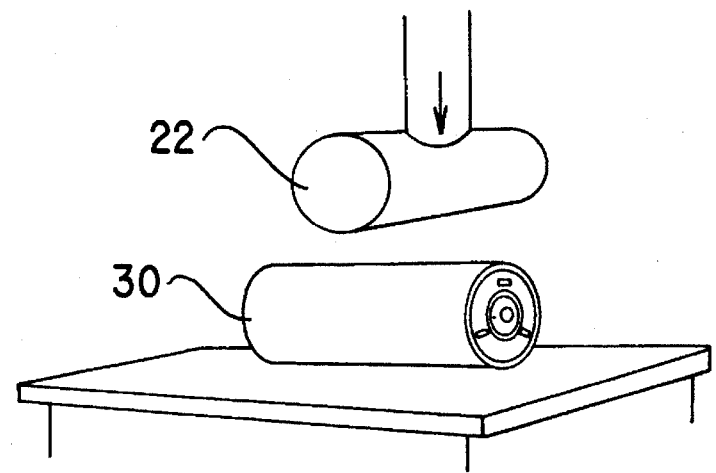

BATTERY HAVING DIVIDED ELECTRODE PORTIONS

The present invention relates to improvements in the safety of batteries and provides non-aqueous electrolyte batteries which are especially safe and great in capacity.

With the development of electronic devices of smaller sizes and reduced weights, there is an increased demand for highly efficient batteries which are useful as power sources for such devices.

The exhaust gas of motor vehicles using gasoline as fuel is thought one of the major causes for the destruction of environment of the earth. In 1998, the new Exhaust Control Act is to be enforced in California, U.S. The act requires that 2% of the total number of vehicles sold by every automaker be emission-free electric motor vehicles. One of the important components of electric motor vehicles is the secondary battery, the performance of which governs the basic performance of the vehicle, i.e., acceleration performance and mileage available by one charging operation. Accordingly, highly efficient large secondary batteries are also required for this use.

Non-aqueous electrolyte batteries, which were expected to achieve a high efficiency, had the drawback of being poor in heavy-load characteristics and low-temperature characteristics, whereas such batteries are adapted to deliver a sufficiently great current even at low temperatures by incorporating an electrode structure in the form of a spiral roll of thin electrodes (jelly roll structure), and are introduced into actual use as high-efficiency batteries. Primary batteries wherein metallic lithium is used for the negative electrode, i.e., so-called lithium batteries, are already in use for cameras and the like.

Non-aqueous electrolyte secondary battery has been developed which included a negative electrode of carbon to utilize ingress of lithium ions into and egress thereof from the carbon. This battery was named lithium ion secondary battery and introduced into the world for the first time in 1990 by the present inventors (see the magazine, "Progress in Batteries & Solar Cells," Vol. 9, 1990, p.209). At present, the battery is so recognized as to be called the "lithium ion secondary battery of the next generation" in the battery industry and academic world, and efforts are made by many people for the development of the battery. Typically with use of a lithium-containing complex oxide ($LiCoO_2$ or $LiMn_2O_4$) for the positive electrode and coke, graphite or like carbonaceous material for the negative electrode, the battery has an electrode structure in the form of a spiral roll (jelly roll structure) and adapted for use under a heavy load or at a low temperature.

In addition to a high energy density, safety is essentially required of high-efficiency batteries for use in electronic devices or electric motor vehicles.

However, the higher the efficiency or capacity of the battery is, the more susceptible is the battery to thermorunaway in the event of short-circuiting since marked heat generation within the battery then induces component substances thereof to undergo a direct chemical reaction therebetween inside the battery.

Further because an active material (such as metallic lithium or lithium-doped carbon) which is advantageous for realizing a high energy density is used in the non-aqueous electrolyte battery, the battery is much more susceptible to thermorunaway when incorporating the electrode structure adapted for use under a heavy load. Accordingly, it is already practice to connect a PTC (Positive Temperature Coefficient) resistor (which greatly increases in resistance value when generating heat due to a current in excess of a certain value and which functions to block the excessive current) between the positive or negative electrode and the external terminal to block short-circuit current in the event of external short-circuiting and to thereby assure the battery of safety.

Nevertheless, in the event of internal short-circuiting, the short-circuit current does not pass through the PTC element as installed in the conventional manner and can not therefore be blocked. Thus, effective means still remains to be developed for ensuring safety against internal short-circuiting.

The main object of the present invention is to provide a battery which is assured of safety against internal short-circuiting even if large-sized, especially a non-aqueous electrolyte battery which is expected as a battery of high energy density and which is usable with safety even when having a large size.

According to the present invention, at least one of a positive electrode and a negative electrode constituting an electrode assembly comprises at least two divided electrode portions not electrically connected through electron conduction, and each of the divided electrode portions has an electrode lead extending outward from a closed container accommodating the electrode assembly. The battery container has externally thereof at least two external terminals of the same polarity each provided by the electrode lead.

FIG. 2 is a diagram showing the structural principle of conventional sealed batteries. With the conventional sealed battery which has a capacity of nc (Ah), a pair of positive electrode 2 and negative electrode 1 with a unit capacity of c (Ah) are opposed to each other with an electrolyte-containing separator 3 interposed therebetween, and n pairs of such electrodes are enclosed in a battery container 4. All the positive electrodes $2_{1-n}$ within the battery are electrically connected through electron conduction by connecting positive electrode leads 7 together inside the container 4 or connecting all current collectors of positive electrode together, and are connected to a single positive electrode external terminal 8 exposed from the closed container. All the negative electrodes $1_{1-n}$ within the battery are electrically connected through electron conduction similarly by connecting negative electrode leads 5 together inside the container or connecting all current collectors of negative electrode together, and are connected to a single negative electrode external terminal 6 exposed from the container. Further when the battery has a safety measure against external short-circuiting, one PTC device 10 is interposed between the positive or negative lead or current collector connection and the corresponding external terminal. In the event of the negative electrode $1_1$ and the positive electrode $2_2$ short-circuiting at point A shown in FIG. 2 inside the conventional battery, not only the current i generated by the electrodes $1_1$ and $2_1$ but also the current generated by the negative electrodes $1_2$–$1_n$ and the positive electrodes $2_2$–$2_n$ flow into point A with the result that the current (I=ni) generated by all the electrodes concentrates on point A.

In the event of an internal short-circuiting in the conventional arrangement including the PTC device 10, the PTC element serves no function since the short-circuit current does not flow through this element. Consequently, when the battery has a great capacity, temperature rises greatly at point A, leading to thermorunaway of the battery. Especially in the case of nonaqueous electrolyte batteries, the battery fiercely smokes or becomes ignited even if it is not very great (about 1 to about 2 Ah) in capacity.

On the other hand, FIG. 1 is a diagram showing the structural principle of a sealed battery having a capacity nc (Ah) and embodying the invention. At least the positive electrodes or negative electrodes of the battery are at least two (n) divided electrodes which are not connected electrically through electron conduction, and the divided electrodes each have an electrode lead extending to the outside of a closed container housing these battery elements. At least two external terminals of the same polarity are provided outside the battery container respectively for the leads. Stated more specifically with reference to FIG. 1, positive electrodes $2_1 \sim 2_n$ are not connected electrically through electron conduction. Accordingly in the event of a negative electrode $1_1$ and the positive electrode $2_1$ internally short-circuiting at point A shown in FIG. 1, only the current i generated by these electrode $1_1$ and $2_1$ is the short-circuit current at point A, and the current produced by negative electrodes $1_2 \sim 1_n$ and the positive electrodes $2_2 \sim 2_n$ does not flow into point A since the inflow channel to point A is not continuous, that is, positive electrode leads $7_2 \sim 7_n$ are not connected to the inflow channel via a positive lead $7_1$. Even if the battery is great in the number n, i.e., in capacity, therefore, the temperature at point A does not rise to such a high level as to induce thermorunaway within the battery, whereby the hazard due to the short circuit is avoidable. Even when n=2 simply, that is, even when the positive electrode or negative electrode is divided merely in two, the amount of heat generation at point A is ¼ the corresponding amount, and when n=4, heat generation diminishes to ⅟₁₆. Thus, the advantage of the invention will be apparent.

Furthermore, the battery of the invention can be discharged or charged across a negative electrode external terminal 6 and a positive electrode external terminal 8 which are provided outside the battery container, the terminal 8 being one of positive external terminals $8_1 \sim 8_n$ as changed over from another one of them in succession. Moreover, when the battery is discharged in this way, the user can recognize the remaining battery capacity merely by identifying the particular positive electrode external terminal currently used for discharge. For example, when discharge is effected through the mth terminal, (n–m)/n of the overall capacity is the remaining capacity.

FIG. 3(a) shows a battery 30 of the invention wherein external terminals $8_1 \sim 8_n$ of the same polarity are each connected to the corresponding lead by way of a resistor 10 having a PTC effect. In the event of short-circuiting at point A in FIG. 1, the resistors 10 with the PTC effect are invariably present in the path of flow into point A of the current generated by negative electrodes $1_2 \sim 1_n$ and positive electrodes $2_2 \sim 2_n$, i.e., the path by way of positive leads $7_2 \sim 7_n$ and a positive lead $7_1$. In the arrangement of the invention including the PTC resistors, therefore, the current generated by the negative electrodes $1_2 \sim 1_n$ and the positive electrodes $2_2 \sim 2_n$ is blocked by the PTC resistors 10, so that the short-circuit current at point A is almost entirely the current i generated by the negative electrode $1_1$ and the positive electrode $2_1$. Consequently, even if the battery is great in n, i.e., in capacity, the temperature at point A does not rise to such a high level as to induce thermorunaway within the battery, whereby the hazard due to the internal short circuit is similarly avoidable. In this case, the battery is discharged or charged in exactly the same manner as in the conventional battery through a negative electrode external terminal 6 and a positive electrode collective terminal 9 to which the PTC resistors 10 are collectively connected.

The present invention will be described below in greater detail with reference to examples.

Figure 3A:
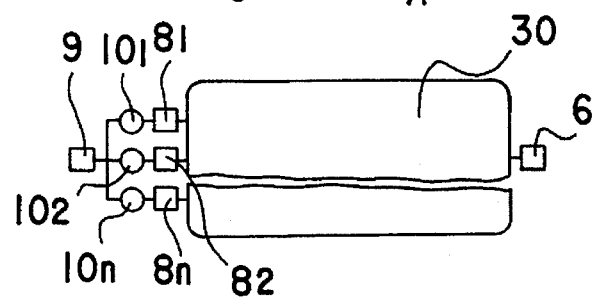
Figure 3B:
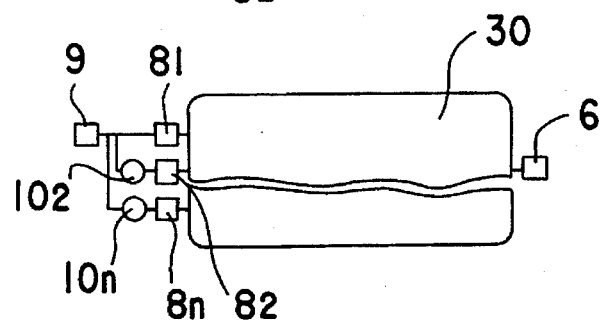
Figure 4:
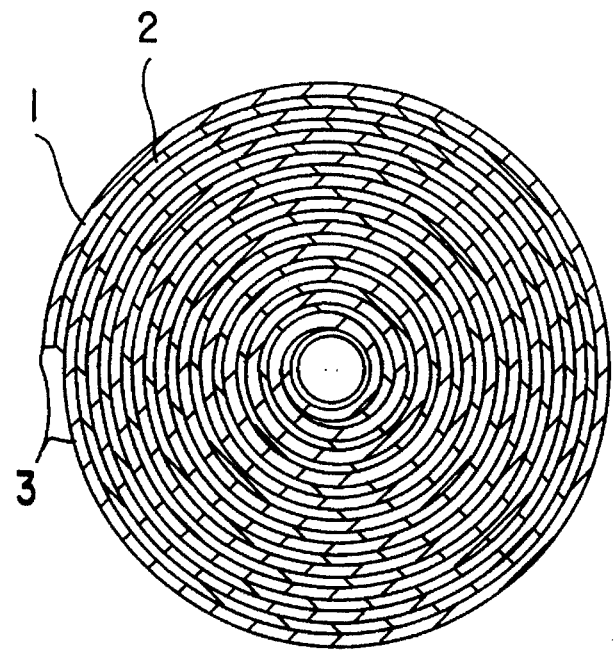
Figure 5:
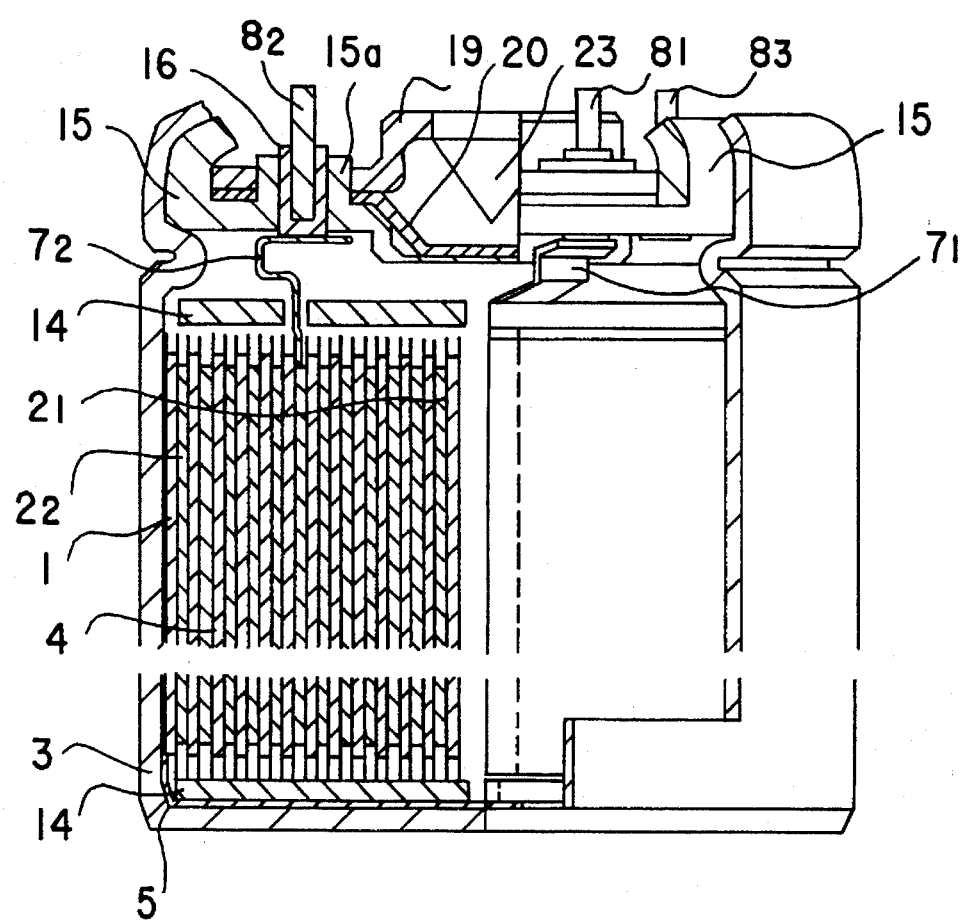
Figure 6A:
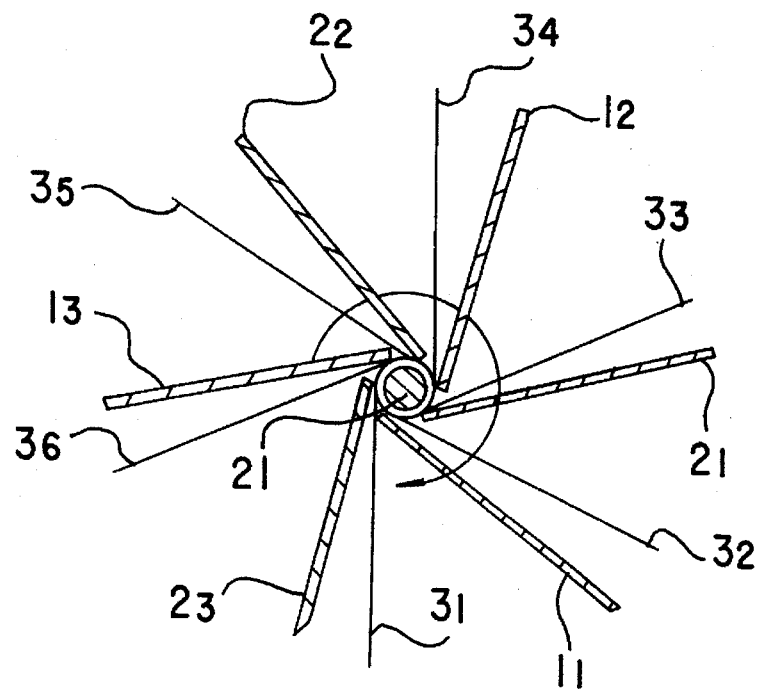
Figure 6B:
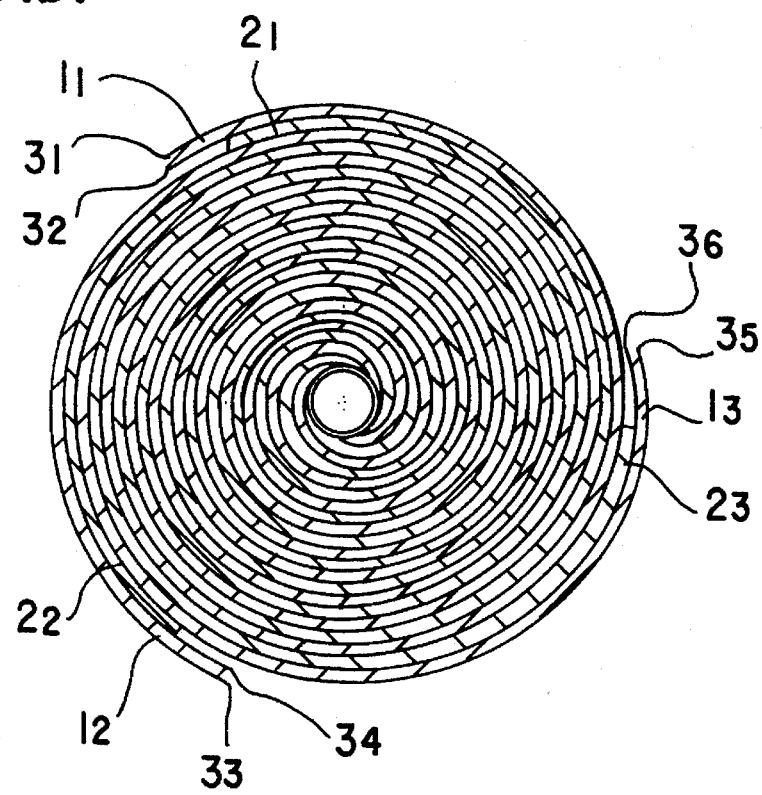

FIG. 3 includes diagrams each showing PTC resistors as connected to a battery of the invention;

FIG. 4 is a sectional view of an electrode assembly in the form of a roll;

FIG. 5 is a schematic view in section showing the construction of a cylindrical battery;

FIG. 6a and 6b is a sectional view of a roll of positive and negative electrodes each comprising three divided portions;

FIG. 7 includes a sectional view and a plan view showing two positive electrodes connected together;

FIG. 8 shows discharge curves of battery samples; and

FIG. 9 shows a battery crushing device.

1: negative electrode, 2: positive electrode, 3: separator, 4: battery can, 5: negative electrode lead, 6: negative electrode external terminal, 7: positive electrode lead, 8: positive electrode external terminal, 9: positive electrode collective terminal, 10: PTC resistor, 14: insulating plate, 15: plastic seal, 16: aluminum cover, metal cover, 20: explosion-proof disk, 21: take-up spool, 22: metal round rod, 23: triangular blade, 30: battery

EXAMPLE 1

With reference to FIGS. 4, 5 and 7, an example of the present invention will be described. FIG. 4 is a sectional view of an electrode assembly for a cylindrical battery prepared in the present example. FIG. 5 is a schematic view in section showing the construction of the cylindrical battery prepared in the example. FIG. 7 includes a sectional view and a plan view of a striplike positive electrode for use in preparing the electrode assembly of the example.

The electrode assembly for generating electricity is prepared in the following manner.

Four parts by weight of carbon black and 10 parts by weight of polyvinylidene fluoride (PVDF) serving as a binder are mixed wet with 86 parts by weight of mesocarbon microbeads (doo2=3.37 Å) heat-treated at 2800° C. and serving as a negative electrode active substance, with addition of N-methyl-2-pyrrolidone to obtain a slurry (paste). Copper foil having a thickness of 0.01 mm and serving as a current collectors of negative electrode is then uniformly coated with the slurry over opposite surfaces, dried and thereafter pressed by a roller press into a negative electrode sheet, 0.15 mm in thickness.

Positive electrodes were prepared in the following manner. Commercial lithium carbonate ($Li_2CO_3$) and cobalt carbonate ($CoCO_3$) are mixed together in a Li to Co atomic ratio of 1.03:1, and the mixture is baked in air at 900° C. for about 10 hours to obtain $LiCoO_2$ in the form of a very hard block. The block is treated by a pulverizer to obtain a powder having a mean particle size of 0.02 mm. The $LiCoO_2$ powder (91 parts by weight), 6 parts by weight of graphite serving as a conductive agent and 3 parts by weight of polyvinylidene fluoride serving as a binder are mixed together wet into slurry (paste) along with N-methyl-2-pyrrolidone as a solvent. Aluminum foil having a thickness of 0.02 mm and serving as a positive electrode current collector is then uniformly coated with the slurry over opposite surfaces, dried and thereafter pressed by the roller press into a positive electrode sheet, 0.13 mm in thickness.

Two positive electrodes 2 and one negative electrode 1 each having the width and length given below are prepared from the positive and negative electrode sheets thus obtained, and the current collector is left exposed locally at one end of each electrode. A nickel lead 5 is attached to the exposed end for the negative electrode, and an aluminum lead 7 to the exposed end for each positive electrode.

|  | Width | Length |
|---|---|---|
| Negative electrode 1 | 57 mm | 550 mm |
| Positive electrode 2 | 54 mm | 250 mm |

The two positive electrodes $2_1$ and $2_2$ thus adjusted in width and length are connected together into an electrode strip with an insulating tape as shown in FIG. 7. At this time, the current collectors 40 of the two electrodes are out of contact with each other, and the two electrodes are not connected electrically through electron conduction but are divided electrically. The two electrodes respectively has positive electrode leads $7_1$ and $7_2$ each welded to the current collector 40 exposed from active substance layers 41 at the electrode end. The two positive electrode leads are of course out of electrical conduction.

The strip of two positive electrodes connected together and the negative electrode 1 with the adjusted width and length are spirally wound up in combination with a porous polypropylene separator 3 held therebetween to prepare an electrode assembly in the form of a roll of the structure shown in FIG. 4 and having an average outside diameter of 15.7 mm. Projecting from the electrode assembly are one negative electrode lead 5 and two positive electrode leads $7_1$, $7_2$.

Next as shown in FIG. 5, an insulating plate 14 is installed in the bottom of an iron battery can 4 measuring 16.5 mm in outside diameter and 68 mm in length and plated with nickel, and the electrode assembly is accommodated in the can. The negative electrode lead 5 projecting from the electrode assembly is welded to the bottom of the battery can. An insulating plate 14 is thereafter installed also on the top of the electrode assembly. A closure prepared in advance has three positive electrode external terminals $8_1$, $8_2$ and $8_3$, two $8_1$ and $8_2$ of which are selected and connected to the respective positive electrode leads $7_1$ and $7_2$ projecting from the electrode assembly by welding each lead to a cover 16 covering the terminal.

Next, a solution of 1 mole/liter of $LiPF_6$ in a mixture of ethylene carbonate (EC) and diethyl carbonate (DEC) is poured into the battery can as an electrolyte. The closure is thereafter fitted to the can, and the opening edge of the can is crimped, whereby a battery A is assembled which has the structure shown in FIG. 5 and is 16.5 mm in outside diameter and 65 mm in height.

The closure is an assembly of a plastic seal 15, metal cover 19, explosion-proof disk 20 and three positive electrode external terminals $8_1$, $8_2$ and $8_3$. The positive electrode external terminal 8 comprises a nickel-plated stainless steel bar inserted in the terminal cover 16 of aluminum by press fit and is therefore covered with aluminum at the portion thereof which is left exposed inside the battery. The explosion-proof disk 20 and the metal cover are superposed on the plastic seal 15, with three projections 15a on the seal 15 fitted three holes formed in the disk 20 and in the metal cover 19, and the external terminals 8 covered with aluminum are each forced into a center bore of the projection 15a of the seal, the terminal being slightly larger than the bore in diameter. Since the portion of hole of the metal cover is fitted around each projection 15a at this time, the plastic projection is compressed to hold the terminal in hermetic contact therewith. The closure further has the following function. If the internal pressure of the battery builds up due to overcharging or like abnormality, the central portion of the plastic seal bulges along with the explosion-proof disk 20 which is made of aluminum, permitting a triangular blade 23 projecting downward from the metal cover to rupture the disk and the plastic seal at the central portion to release the pressure to the outside with safety.

Comparative Example 1

An electrode assembly is prepared by the conventional method to prepare a battery B having the same size as in Example 1 for the comparison of safety performance.

First, a positive electrode and a negative electrode each having the width and length given below and suitable for making the electrode assembly by the conventional method are prepared from the respective positive and negative electrode sheets obtained in Example 1. The current collector is left exposed locally at one end of each electrode, to which a nickel lead 5 for the negative electrode and an aluminum lead 7 for the positive electrode are attached by ultrasonic welding.

|  | Width | Length |
|---|---|---|
| Negative electrode 1 | 57 mm | 550 mm |
| Positive electrode 2 | 54 mm | 500 mm |

The negative electrode 1 and the positive electrode 2 thus dimensioned are wound up in exactly the same manner as in Example 1 into a roll having approximately the same outside diameter as in Example 1. The coiled electrode assembly has one negative lead 5 and one positive lead 7 projecting therefrom.

The electrode assembly thus completed is housed in the same manner as in Example 1 in an iron battery can 4 plated with nickel and the same as the one use in Example 1. Thereafter following exactly the same procedure as in Example 1, a battery B is fabricated which measures 16.5 mm in outside diameter and 65 mm in height and which has nearly the same construction as the battery of Example 1, i.e., the construction shown in FIG. 5.

However, the closure prepared in advance and the same as the one used in Example 1 has three positive electrode external terminals, whereas only one positive electrode lead extends from the present electrode assembly, so that only one of these terminals is used. The positive electrode lead 7 projecting from the electrode assembly is welded to the cover 16 of the single external terminal $8_1$.

Safety Performance Test Result 1

Batteries A and the battery B thus prepared in Example 1 and Comparative Example 1 are allowed to stand at room temperature for an aging period of 12 hours to stabilize the internal components of each battery. The batteries A of Example 1 are divided into three groups. One group of batteries are batteries $A_1$ as prepared in Example 1. The batteries $A_2$ of the second group have the connection shown in FIG. 3(a), such that the two positive electrode external terminals $8_1$, $8_2$ are connected, each by way of one PTC resistor (for example, PolySwitch PTC of Raychem Corporation), to a single collective positive electrode terminal 9. With the batteries $A_2$ of the second group, therefore, the two positive electrode terminals are connected to each other via two PTC resistors $10_1$, $10_2$ arranged in series. With the batteries $A_3$ of the third group, the two positive electrode external terminals $8_1$, $8_2$ are connected, with a PTC resistor 102 interposed therebetween like the connection shown in FIG. 3(b).

Method of Charging Batteries

First, the battery B of the comparative example is charged by the conventional method at room temperature for 8 hours using a charger which is set to a charging current of 400 mA and an upper-limit charging voltage of 4.1 V. The positive terminal of the charger is connected to the positive electrode external terminal 8 of the battery B, and the negative terminal thereof to the negative electrode external terminal of the battery B, i.e., to the battery can.

The battery $A_1$ of Example 1 is charged with use of a charger set to a charging voltage of 400 mA and upper-limit charging voltage of 4.1 V and having its negative terminal connected to the negative electrode external terminal of the battery, i.e., to the battery can. The battery is charged at room temperature for 4 hours with the positive terminal of the charger connected first to the positive electrode external terminal $8_1$, and then charged similarly for 4 hours with the charger positive terminal connected alternatively to the next positive electrode external terminal $8_2$.

The batteries $A_2$ and $A_3$ are charged in exactly the same manner as the battery B. First, the charger is set to a charging current of 600 mA and an upper-limit charging voltage 4.1 V. The positive terminal of the charger is connected to the collective positive electrode external terminal 9, and the negative terminal thereof to the negative electrode external terminal which is the battery can. Charging is continued at room temperature for 8 hours.

Discharging of Batteries

When the batteries as completely charged are discharged at room temperature at a constant current of 300 mA to a termination voltage of 3.0 V, a discharge capacity about 1050 mAh is obtained with all the batteries. This indicates that the batteries A of the invention exhibit satisfactory performance and are comparable to the battery B prepared by the conventional method. In this procedure, the battery $A_1$ is discharged at room temperature at the same constant current of 300 mA as the other batteries, with the discharge circuit connected first to the positive electrode external terminal $8_1$. Upon the terminal voltage at the terminal $8_1$ reaching the termination voltage of 3.0 V, the discharge circuit is alternatively connected to the next external terminal $8_2$ to discharge the battery similarly. The discharging is terminated upon the terminal voltage at the external terminal $8_2$ reaching 3.0 V. Accordingly, the discharge capacity of the battery $A_1$ is given by the combined capacity available with completion of discharging at the second external terminal $8_2$.

Safety Test of Batteries

The batteries $A_1$, $A_2$, $A_3$ and B as completely charged by the foregoing charging method are subjected to a crush test by crushing the battery to ¼ of the original diameter of the battery using a device shown in FIG. 9.

FIG. 9 shows the principle of the crusing device. A round rod 22, 16 mm in diameter, is lowered by a hydraulic press to crush the battery 30.

Table 1 shows the result of the crush test of the batteries. Some of the conventional batteries B ignite or fiercely smoke when tested. This appears attributable to internal short-circuiting of the battery resulting from crushing and permitting the current generated by all the electrodes inside the battery to concentrate on the portion short circuit, where the product of the short-circuit resistance R and the square of the short-circuit current I, i.e., $I^2R$, produces heat to raise the temperature to a high level, consequently initiating the active material in the battery (such as lithium-doped carbon or electrolyte) into vigorous reaction for ignition or smoking.

TABLE 1

| Battery | Result of crushing |
|---|---|
| $A_1$ | All five batteries similarly have their explosion-proof disk ruptured, permitting the electrolyte to slightly seep therethrough. |
| $A^2$ | The same as $A_1$. |
| $A^3$ | The same as $A_1$. |
| B | Fire breaks out in one out of five batteries, and burning continues for several minutes. Two out of the five batteries force out a white smoke without burning. |

With the battery $A_1$ of the invention, on the other hand, the positive electrodes $2_1$ and $2_2$ are not electrically connected to each other through electron conduction, so that the current concentrating on the portion of short circuit is the current generated by the positive electrode $2_1$ or $2_2$ only. This current is in proportion to the electrode area, is therefore one-half of the corresponding current in the conventional battery and produces ¼ of the quantity of heat conventionally generated at the portion of short circuit. It is accordingly thought that the temperature does not so rise as to induce an intense reaction of active material within the battery and to cause ignition or smoking. Further with the batteries $A_2$ and $A_3$, the two positive electrode external terminals $8_1$, $8_2$ are connected only via the PTC resistor 10, so that the current flowing into the portion of short circuit from other electrodes is blocked by the PTC resistor, hence substantially the same result as is achieved by the battery $A_1$.

EXAMPLE 2

Three negative electrodes 1 and three positive electrodes 2 each having the width and length given below are prepared from the negative and positive electrode sheets obtained in Example 1.

The current collector is left locally exposed at one end of each electrode, to which a nickel lead 5 for the negative electrode and an aluminum lead 7 for the positive electrode are attached by ultrasonic welding.

|  | Width | Length |
|---|---|---|
| Negative electrode 1 | 84 mm | 183 mm |
| Positive electrode 2 | 81 mm | 167 mm |

As shown in FIG. 6(a), the three negative electrodes $1_1$, $1_2$, $1_3$ and the three positive electrodes $2_1$, $2_2$, $2_3$ thus dimensioned in width and length are arranged in the respective spaces between six porous polypropylene separators $3_1$, $3_2$, $3_3$, $3_4$, $3_5$, $3_6$ wound around a take-up spool 21 of a winding machine several turns, and are wound up in the direction of arrow shown into a roll of the structure shown in FIG. 6(b) to prepare an electrode assembly, 15.7 mm in average outside diameter. The electrode assembly has three negative electrode leads 5 and three positive electrode leads 7 projecting therefrom. These three positive or negative leads are not electrically connected to one another through electron conduction.

Figure 1:
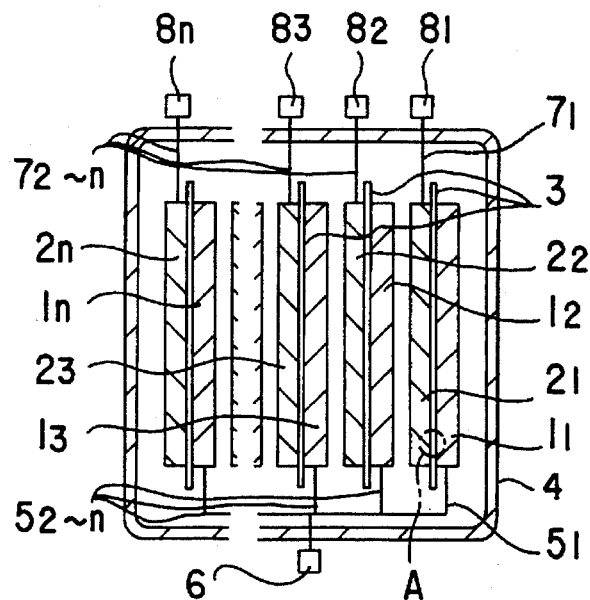
FIG. 1 is a diagram showing the structural principle of the battery of the invention.
Figure 2:
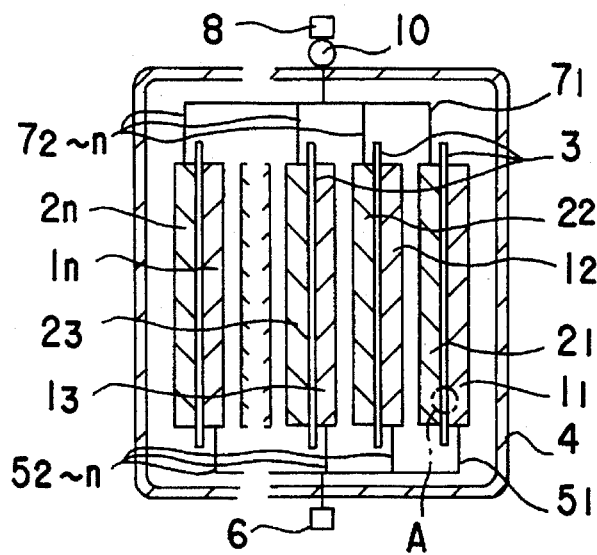
FIG. 2 is a diagram showing the structural principle of a conventional battery.

In the same manner as in Example 1, the electrode assembly thus completed is accommodated in an iron battery can 4b plated with nickel, the same as the battery can of FIG. 1 in outside diameter but different therefrom in length [16.5 mm (diameter)×95 mm]. The three negative electrode leads 5 projecting from the electrode assembly are all welded to the bottom of the battery can, an insulating plate 14 is thereafter installed on the top of the assembly, and the three positive electrode leads $7_1$, $7_2$, $7_3$ projecting from the assembly are welded to the respective three positive electrode external terminals $8_1$, $8_2$, $8_3$ attached to the same closure as used in Example 1.

Next, a solution of 1 mole/liter of $LiPF_6$ in a mixture of ethylene carbonate (EC) and diethyl carbonate (DEC) is poured into the battery can as an electrolyte. The closure is thereafter fitted to the can, and the opening edge of the can is crimped, whereby a battery C is fabricated which has the structure shown in FIG. 5 (but differs from the battery of Example 1 in the number of positive electrode leads connected to the positive electrode external terminals 8 and in the height) and measures 16.5 mm in outside diameter and 92 mm in height.

Comparative Example 2

An electrode assembly is prepared by the conventional method to prepare a battery D having the same size as in Example 2 for the comparison of safety performance.

First, a positive electrode and a negative electrode each having the width and length given below and suitable for making the electrode assembly by the conventional method are prepared from the respective positive and negative electrode sheets obtained in Example 1. In the same manner as described, the current collector is leer exposed locally at one end of each electrode, to which a nickel lead 5 for the negative electrode and an aluminum lead 7 for the positive electrode are attached by ultrasonic welding.

|  | Width | Length |
| --- | --- | --- |
| Negative electrode 1 | 84 mm | 550 mm |
| Positive electrode 2 | 81 mm | 500 mm |

The negative electrode 1 and the positive electrode 2 thus dimensioned in width and length are wound up in exactly the same manner as in Example 1 into the same structure as shown in FIG. 4 in section, whereby an electrode assembly is obtained which is in the from of a roll, 15.7 mm in outside diameter. The assembly has one negative electrode lead 5 and one positive electrode lead 7 projecting therefrom.

The electrode assembly thus completed is encased in the same manner as in Example 2 in an iron battery can 4b plated with nickel and measuring 16.5 mm in outside diameter and 95 mm in length like the one used in Example 2. Following exactly the same procedure as in Example 2, a battery D is fabricated which has the structure shown in FIG. 5 and measures 16.5 mm in outside diameter and 92 mm in height.

Although the closure to be used also has three positive electrode external terminals, the electrode assembly has one positive electrode lead extending therefrom, so that only one of these terminals is used. The positive electrode lead 7 projecting from the assembly is welded to the external terminal $8_1$.

Batteries C and the battery D thus prepared in Example 2 and Comparative Example 2 are allowed to stand at room temperature for an aging period of 12 hours to stabilize the internal components thereof. The batteries of Example 2 are divided into three groups. Those of the first group are batteries $C_1$ as prepared in Example 2. The batteries $C_2$ of the second group have the circuit shown in FIG. 3(a); the three positive electrode external terminals $8_1$, $8_2$, $8_3$ are connected to PTC resistors (for example, PolySwitch PTC of Raychem Corporation) $10_1$, $10_2$, $10_3$, respectively, and then to a single collective positive electrode terminal 9. With the batteries $C_2$, therefore, all the terminals are connected to one another via two PTC resistors as arranged in series. The batteries $C_3$ of the third group have the circuit shown in FIG. 3(b); one of the three positive electrode terminals $8_1$, $8_2$, $8_3$, i.e., the terminal $8_1$, is connected directly to a collective positive electrode terminal 9, and the other two PTC resistors are connected, each via one PTC resistor $10_2$ or $10_3$, to the collective terminal 9. With the batteries $C_3$, therefore, the terminal $8_1$ is connected to the terminal $8_2$ via the PTC resistor $10_2$ and to the terminal $8_3$ via the PTC resistor and the terminal $8_2$ is connected to the terminal $8_3$ via the PTC resistors $10_2$, $10_3$ as arranged in series.

Method of Charging Batteries

First, the battery D of the comparative example is charged by the conventional method at room temperature for 8 hours using a charger which is set to a charging current 600 mA and an upper-limit charging voltage of 4.1 V. The positive terminal of the charger is connected to the positive electrode external terminal 8 of the battery D, and the negative terminal thereof to the negative electrode external terminal of the battery D, i.e., to the battery can.

The battery $C_1$ of Example 2 is charged with use of a charger set to a charging voltage of 600 mA and an upper-limit charging voltage of 4.1 V and having its negative terminal connected to the negative electrode external terminal of the battery, i.e., to the battery can. The battery is charged at room temperature first for three hours with the positive terminal of the charger connected to the positive electrode external terminal $8_1$, then for three hours with the charger positive terminal connected alternatively to the next positive electrode external terminal $8_2$, and finally for three hours with the charger positive terminal connected to the third positive electrode external terminal $8_3$ by a changeover.

The batteries $C_2$ and $C_3$ are charged in exactly the same manner as the battery D. First, the charger is set to a charging current of 600 mA and an upper-limit charging voltage of 4.1 V. The positive terminal of the charger is connected to the collective positive electrode external terminal 9, and the charger negative terminal to the negative electrode external terminal, i.e., to the battery can. Charging is continued at room temperature for 8 hours.

Discharging of Batteries

FIG. 8 shows the discharge curves of the batteries obtained by discharging the batteries, as completely charged, at room temperature at a constant current of 500 mA to a termination voltage of 3.0 V. It has been found that the batteries are all about 1500 mAh in initial capacity and that the batteries C embodying the invention are comparable to the battery D prepared by the conventional method in performance. However, the discharge curve of the battery $C_1$ is divided into three portions unlike those of the other batteries because of the following mode of discharge. The battery $C_1$ is discharged at room temperature at the same constant current of 500 mA as the other batteries, first with the discharge circuit connected to the positive electrode external terminal $8_1$ and then with the discharge circuit connected to the next positive electrode external terminal $8_2$ upon the terminal voltage at the terminal $8_1$ reaching the termination voltage of 3.0 V, followed by discharge through the third positive electrode external terminal $8_3$. The discharge is completed upon the terminal voltage at the terminal $8_3$ reaching 3.0 V. The discharge capacity of the battery $C_1$ is naturally the combined capacity available with the completion of discharge through the third external terminal 83. Conversely, if the battery of the invention is discharged in this mode, the particular positive electrode external terminal m, if only identified, indicates to the user that $(n-m)/n$ of the overall capacity is the remaining capacity. For example, when discharge is effected through the second terminal of the battery $C_1$, this indicates that the remaining capacity is at least $(3-2)/3$ of its capacity.

Safety Test of Batteries

The batteries $C_1$, $C_2$, $C_3$ and D as completely charged by the foregoing charging method are subjected to a crush test by crushing the battery to ¼ of the original diameter thereof using the device of FIG. 9.

Table 2 shows the result of the crush test of the batteries.

When crushed for testing, the conventional batteries D all ignite or smoke. This is thought attributable to the fact that in view of the electrode area, the amount of current produced by all electrodes within the battery when the battery is crushed is 50% greater than in the case of the battery B of Comparative Example 1. Stated more specifically, the quantity of heat generated at the portion of short circuit corresponds to the square of current and is therefore $1.5^2$ times the quantity of heat generated in the battery B, hence a greatly increased frequency of ignition or smoking.

With the battery $C_1$ embodying the invention, on the other hand, the positive electrodes $2_1$, $2_2$, $2_3$ are not connected electrically to one another through electron conduction. The divided electrodes have approximately the same area as those of the battery A of Example 1, so that the current concentrating on the portion of short circuit is equivalent to that in the case of the battery A of Example 1. The battery $C_1$ is 50% greater than the battery A of Example 1 or the battery B of Comparative Example 1 in capacity, whereas like the battery A, it is ¼ of the battery B and ⅑ of the battery D in the quantity of heat generated at the portion of short circuit. Presumably, this obviates smoking or ignition.

TABLE 2

| Battery | Result of crusing |
|---|---|
| $C_1$ | All five batteries similarly have their explosion-proof disk ruptured, permitting the electrolyte to slightly seep therethrough. |
| $C_2$ | The same as $C_1$. |
| $C_3$ | The same as $C_1$. |
| D | Fire breaks out in two out of five batteries, and burning continues for several minutes. The other three batteries force out a white smoke without burning. |

With the batteries $C_2$ and $C_3$, the three positive electrode external terminals $8_1$, $8_2$, $8_3$ are connected only via the PTC resistor 10, so that the current flowing into the portion of short circuit from other electrodes is almost completely blocked by the PTC resistor. Thus, these batteries exhibit the same safe result as the batteries A and $C_1$.

Although the present invention has been described with reference to the foregoing examples wherein lithium ion secondary batteries are prepared using a carbon material for the negative electrode and a lithium-cobalt oxide for the positive electrode, the invention is not limited to these batteries only but is applicable to all batteries of which heavy-load discharge is required to assure the batteries greatly enhanced safety. Even in the case of lithium ion secondary batteries wherein the same carbon material as the examples is used for the negative electrode and a lithium-manganese complex oxide of spinel structure ($LiMn_2O_4$) is used as the positive electrode active substance, exactly the same result as above is available with the same battery constructions of the examples. The invention can be embodied especially advantageously as lithium primary batteries wherein lithium metal foil is used as a typical active material the negative electrode.

The batteries prepared in the examples are 1 or 1.5 Ah in capacity, comprise two or three divided positive electrodes and have two or three positive electrode external terminals as provided externally on a closed container housing an electrode assembly, whereas batteries of increased capacity are available with high safety with use of a larger number divided electrodes. The divided electrodes are not limited to positive electrodes but the same result can be achieved also when they are negative electrodes. The advantage of the present invention is of course to be expected of batteries which may have at least two external terminals for positive electrodes, as well as for negative electrodes.

Although round rolls are prepared to fabricate cylindrical batteries according to the examples, the present invention is applicable also to square batteries.

At least one of the positive electrode and the negative electrode constituting an electrode assembly is electrically divided into $n(\geq 2)$ portions each having an electrode lead extending outward from the battery container, which has n external terminals each provided by the lead. In the event of internal short-circuiting, the current concentrating on the portion of short circuit reduces to $1/n$ of the conventional value, diminishing the resulting heat generation to $(1/n)^2$, whereby smoking or ignition of the battery is avoidable.

This assures the battery of safety even when it has a great capacity, consequently making it possible to provide batteries of high capacity which are usable for a wide variety of applications. The invention is therefore of a great industrial value.

What is claimed is:

1. A battery wherein an electrode assembly comprising a positive electrode, a negative electrode and a separator sandwiched therebetween is impregnated with an electrolyte and encased in a closed container, wherein at least one of the positive electrode and the negative electrode comprising at least two divided electrode portions which contain no electrically connecting member therebetween within the closed container, each of the divided electrode portions having an electrode lead extending outward from the closed container, the closed container having externally thereof at least two external terminals of the same polarity each provided by the electrode lead, and wherein said at least two external terminals of the same polarity are electrically connected outside of the closed container to each other via a resistor having a Positive Temperature Coefficient (PTC) effect.

* * * * *